Nov. 30, 1937.  B. E. GETCHELL  2,100,327
PASTEURIZING SYSTEM
Filed May 16, 1936  2 Sheets-Sheet 2
Fig. 2.
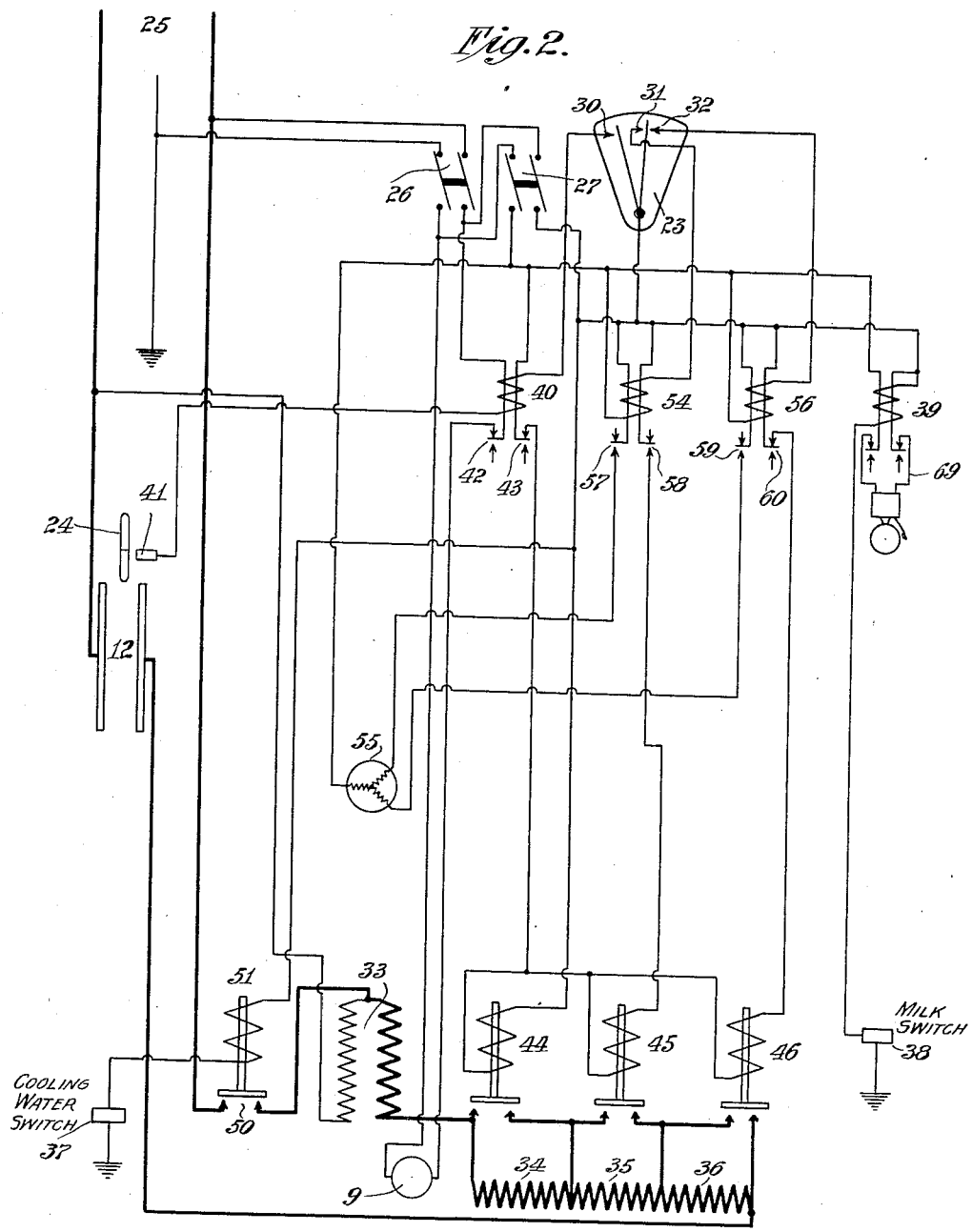
Benjamin E. Getchell
INVENTOR
BY 
ATTORNEY Patented Nov. 30, 1937

2,100,327

UNITED STATES PATENT OFFICE 2,100,327

PASTEURIZING SYSTEM

Benjamin E. Getchell, Plainville, Conn., assignor to The Trumbull Electric Manufacturing Company, Plainville, Conn., a corporation of Connecticut Application May 16, 1936, Serial No. 80,034

12 Claims. (219—20)

My invention relates to means for treating liquids electrically and particularly to what is commonly termed pasteurization where it is necessary to heat the liquid and maintain it at a predetermined high temperature for a predetermined minimum time.

In my former application S. N. 752,223, now Patent No. 2,052,396, I have described a system for the pasteurization of milk in which control is effected by varying the rate of flow of the liquid and also varying the voltage applied to the electrodes.

My present invention contemplates a simplification of the apparatus required and also the arrangement of a system in which the rate of flow of the liquid can be predetermined to synchronize or correspond with the operation of a bottling machine which is commonly used in conjunction with a pasteurizing process and to which it is highly desirable that the milk shall be immediately fed as soon as its treatment has been completed.

By my present invention I provide a circulating system in which the liquid is propelled by the action of a pump which is preferably driven by an electric motor of the type which is self starting when current is applied. The electrodes of the heating chamber are preferably water cooled and the system so arranged that electric current cannot be turned on to operate the heating chamber except when the cooling water is being applied to the electrodes.

The rate of application of heat to the liquid is controlled by varying the power input to the heating chamber by means of an induction regulator which action is in turn controlled by an automatic switching device or contactor, the movable parts of which are actuated thermostatically according to variations in the temperature of the liquid immediately after it has been heated.

In combination with this induction regulator I preferably provide a number of resistances which are cut in and out of the heating circuit. The rate of flow of the liquid is controlled by a manually operable valve in the circulating system which may be set to provide a discharge of the treated liquid at a desired rate.

Variations which occur in the temperature of the raw milk supply and variations in the conductivity of the milk, variations in the room temperature and variations in the line voltage are compensated for automatically by the mechanism. When it is necessary to increase or decrease the rate of flow of the liquid this may be done by adjusting the hand valve. The automatic regulation takes care of the changes required in the power supply to maintain pasteurizing temperature.

Fig. 2 is a diagrammatic view showing the electrical circuits.

Figure 1:
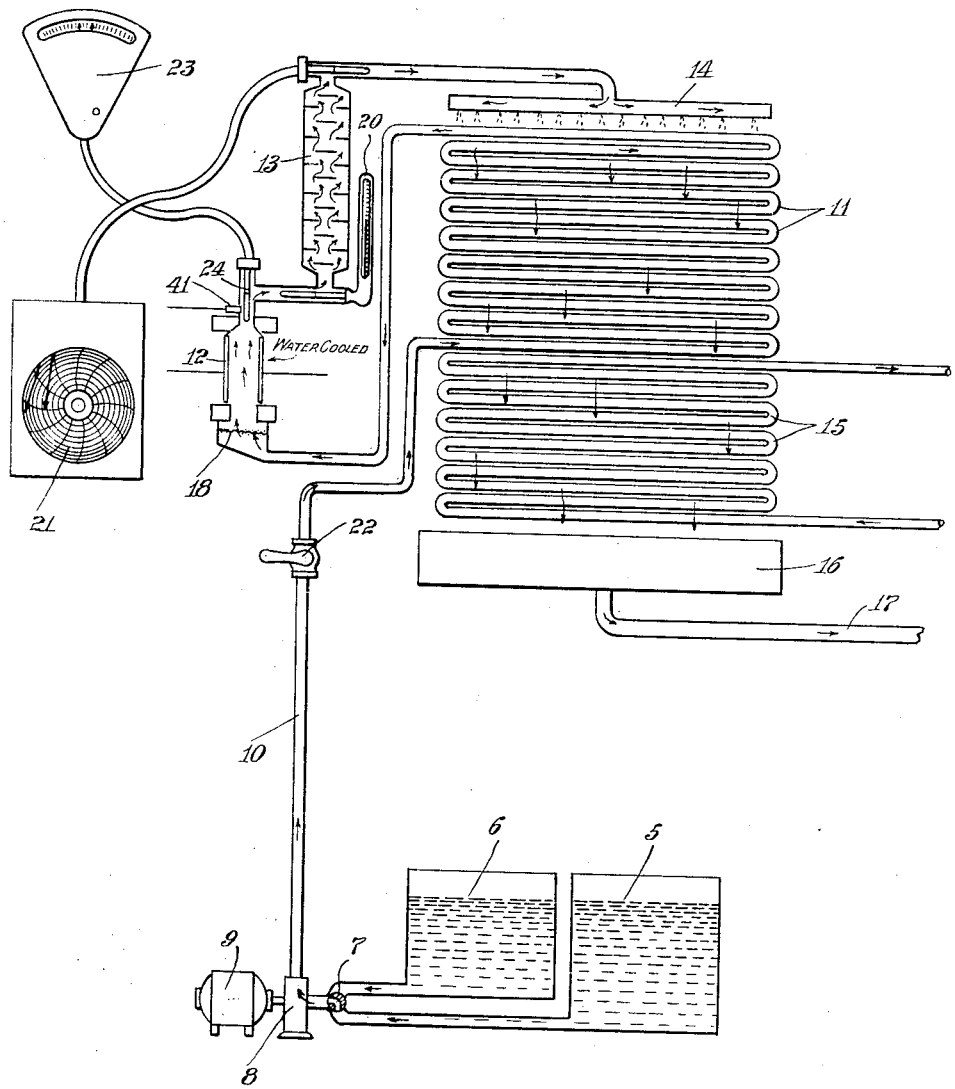
Fig. 1 is a diagrammatic view showing the circulating system and the temperature controlled contactor.

The system is especially applicable to the treatment of milk in which the temperature and time elements must be controlled within very narrow limits and for convenience I will describe the system as applied to the pasteurization of milk. In its broader aspect, however, the invention is not limited to the control of specific temperatures or the treatment of milk alone.

The liquid to be treated will be supplied from one or more reservoirs such as 5. An additional reservoir 6 for a supply of saline solution may also be provided and valve 7 selectively controls the flow from either of these reservoirs. The pump 8 is of a type which permits the liquid to flow backward when the pump rotor is stationary. The pump is driven by a motor 9 which is preferably of a self starting type.

The circulating system for the liquid includes a pipe line or conduit 10, a regenerative coil, heat exchanger or preheater 11, a heating chamber 12, a holding chamber 13, and a spray head or distributing spreader 14 arranged above the preheater coils so that the liquid discharge will flow over the preheater. A refrigerating unit or cooling coil or coils 15 is also provided immediately below the preheater and above the collector 16 which latter discharges the treated and cooled liquid through the conduit or pipe 17 to the bottling machine (not shown). The milk may be filtered before entering the process or in the bottom 18 of the heating chamber. It will be understood, of course, that all the parts through which the liquid flows are so constructed that they can readily be disassembled and cleaned.

The temperature of the liquid as it leaves the heating chamber and before it passes into the holding chamber may be indicated by a thermometer 20. The temperature of the treated milk after it leaves the holding chamber is preferably recorded by a suitable recording instrument 21. The rate of flow of the liquid is controlled by a manually operable valve 22, no attempt being made to vary the speed of the pump except as the pump is started and stopped under the control of the contactor 23 and relays to be hereinafter described. This contactor or switching device may be of any suitable type such as shown in my former application and is actuated by a temperature sensitive element 24 located in the upper end of the heating chamber 12 or immediately above it and below the holding chamber 13.

The system is designed to operate on an ordinary 220 volt commercial line 25 and to be controlled generally by a suitable usual type of entrance or main line switch (not shown).

The pump motor is controlled partly manually by a switch 26 and partly by the action of the contactor switch 23. The switch 26 also serves to control the line side of the switch 27. The switch 27 controls the power to all of the control circuits and also to the alarm circuit.

The contactor 23 has three contacts 30, 31 and 32 one of which is in the circuit guarding against milk flow below the predetermined minimum (of say 160°), one of which is in the circuit for correcting the temperature in case it drops a predetermined small amount (such as one-half a degree) or more below the pasteurizing point, and a third which is in the circuit for correcting the temperature in case it rises a predetermined minimum or more (for instance one-half a degree) above the pasteurizing point.

The power supply to the heating chamber electrodes is under control of the induction regulator 33 and of resistances 34, 35 and 36, the circuits being opened and closed by relays which themselves are controlled by the action of the contactor 23 and/or the action of other circuit controlling devices hereinafter described.

One controlling device includes a switch 37 actuated by the water used to cool the main heating electrodes. This switch is in the circuit of the contactors which control the power to the heating chamber. Failure of cooling water to flow over the electrodes will interrupt the magnetic circuit 51 of magnetic contactor 50, thus stopping the supply of power to the heating chamber.

Another controlling device includes a switch 38 controlled by the milk supply. In case the milk in the raw milk supply tank drops below a predetermined level this relay will open the magnetic circuit of relay 39 causing its contacts to close and actuate an alarm so as to call the attention of the operator to the fact that the milk supply is nearly exhausted.

All relays and magnetic contactors here shown as having moving contact making members are to be understood as moving such members downwardly, when the actuating current is energizing such relays and contactors.

The magnetic relay 40 is connected in the circuit between the contact 30 of the temperature control device and an auxiliary electrode 41 which is arranged in the heating chamber above the main heating electrodes 12. This relay 40 actuates two switch contacts 42 and 43. The former controls the pump motor circuit and the latter controls the circuit through the resistance controlling contactors 44, 45 and 46. The switch 50 in the heating circuit is controlled by the action of a magnetic contactor 51 whose coil is in the circuit with the cooling water actuated switch. The magnetic contactors 44, 45 and 46 serve to shunt out the resistances 34, 35 and 36 respectively when their magnets are energized.

The contact 31 of the thermostatic control device is connected to the coil of the relay 54 which supplies power to the induction regulator motor 55 causing it to operate to increase the effective voltage applied to the heating chamber 12 by changing the degree of reaction of this regulator upon the circuit supplying energy to the heating chamber.

The contact 32 of the thermostatic device is connected to the coil of the magnetic relay 56 which controls the motor of the induction regulator to cause it to operate to lower the voltage applied to the heating chamber.

The relay 54 when energized closes the circuit through switches 57 and 58, the former being in the increasing side of the regulator motor and the latter being in circuit with the coil of the contactor 45, so as to actuate the same.

The relay 56 also actuates two switches 59 and 60, the former being in the decreasing side of the regulator motor circuit and the latter being in circuit with the coil of the contactor 46 so that when the relay 56 is energized it closes the circuit through the induction regulator and opens the circuit through the contactor 46. The induction regulator 33 is automatically operated by its motor 55 to maintain an even temperature at a predetermined rate of flow regardless of changes of the temperature of the raw milk supply, that is, within reasonable limits.

The auxiliary electrode 41 is in what may be termed the pump stop circuit which includes the coil of the relay 40. If there is milk in the heating chamber up to the level of the auxiliary electrode when the contactor device contacts at 30, the circuit is completed through the coil of the relay 40 which is thereby energized and breaks the circuit through the pump motor 9. If there is no liquid in the heating chamber at the level of the auxiliary electrode 41, no circuit is established through the coil of the relay 40, and pump motor 9 will not be affected.

Under normal operating conditions the coil of the contactor 44 is energized and the resistance 34 is shunted out of the heating circuit.

The coil of the contactor 45 is normally unenergized so that the resistance 35 is in series with the heating circuit.

The coil of the contactor 46 is normally energized so that resistance 36 is shunted out of the heating circuit.

By the action of the contactor 44 the resistance 34 is thrown into the heating circuit whenever the pump stops.

The resistance 35 is normally in circuit with the power supply to the heating chamber but when the temperature falls below the predetermined point this resistance is shunted out of circuit by the action of the contactor 45.

The resistance 36 is normally shunted out of the power supply but when the temperature rises above a predetermined point the contactor 46 is deenergized so as to throw the resistance 36 into series with the power supply to the electrode chamber. The relay 40 controls the pump motor circuit and also the circuits through the contactors 44, 45 and 46. When the relay 40 opens the circuit of the pump motor it simultaneously opens the magnetic circuit and the respective contactors thus putting the resistances 34, 35 and 36 into series with the power supply to the electrode chamber.

The relay 40 is controlled by the 160° contact (30) of the thermostatic device 23 and also by the auxiliary electrode 41, working in series with one another.

To start the system it is necessary that saline solution be supplied to tank 6 and raw milk to tank 5. Cooling water should be supplied to electrodes 12. The main disconnect switch should be closed, energizing power line 25. Contactor 23 should be set for a temperature above a predetermined point (say 170°) which setting will automatically keep contact 30 open, otherwise contact 30 would normally cause the pump to stop as soon as the first flow of cold liquid passed control bulb 24 and electrode 41. Valve 7 is set to supply fluid from tank 6 to the system.

Now manually closed switch 26 supplies current through contact 42 of relay 40 to the pump motor. This causes the pump to start and circulate saline solution from tank 6 through the system. Now close switch 27 and the control circuits will be energized as follows: circuit will be established through relay 39 and milk switch 38 which will hold the alarm circuit open. Another circuit is established through the magnet of contactor 51 and cooling water switch 37, thus causing the contacts 50 of contactor 51 to close and establishing the heating circuit through the induction relay 33 to heating chamber 12. If electrode cooling water has not been turned on, switch 37 will prevent contactor 51 from acting and no circuit will be established to heating chamber 12.

Switch 27 also closes a circuit through the magnet of magnetic contactor 44, causing its contacts to close and shunt resistance 34 out of the heating circuit to chamber 12. Another circuit is established through contact 60 of relay 56 through the magnet coil of contactor 46, causing it to close and shunt resistance 36 out of the heating circuit to chamber 12.

Saline solution now flows through the system passing through chamber 12 where it is heated by the action of electric current. Inasmuch as no regeneration has been established in coil 11, this heat is not yet up to the pasteurizing temperature as set at temperature controller 23. Therefore contact 31 will close, establishing a circuit through the coil of relay 54. This causes contacts 57 and 58 to close. Contact 57 completes a circuit through the motor 55 of induction regulator 33 and boosts the voltage of the heating circuit to the maximum limit to increase the speed of heating in chamber 12. At this time a limit switch is automatically opened, causing motor 55 to cease operation. Contact 58 closes the circuit through the coil of magnetic contactor 45, causing its contacts to close and shunt resistance 35 out of circuit, thus further increasing the voltage to heating chamber 12.

The heated saline solution passing over the regenerative coils gradually increases the heat of the liquid before it reaches the heating chamber. This in turn increases the heat of the liquid as it leaves the heating chamber and this cycle of increased heat and increased regeneration gradually brings the heat up to the pasteurizing temperature as set at contactor 23. As soon as the heat of the saline solution comes within say one-half degree of the set temperature, contact 31 opens which interrupts the circuit of relay 54, causing contacts 57 and 58 to open. The opening of contact 57 produces no electrical action as the limit switch of motor 55 in this circuit is already open. Contact 58 opens the circuit of the magnet of magnetic contactor 45 causing its contacts to open and throw resistance 35 back into the heating circuit. The temperature will continue to increase until 23 contacts at 32 at which time the magnet of relay 56 will be energized causing contact 59 to close and contact 60 to open. Contact 59 establishes a circuit through motor 55 of the induction regulator causing it to adjust regulator 33 to lower the voltage to heating chamber 12. The opening of contact 60 interrupts the circuit through the magnet of contactor 46 causing its contacts to open and insert resistance 36 into the circuit with heating chamber 12. Thus both the regulator 33 and resistance 36 cooperate to reduce heating action in chamber 12' and stop it from going above the setting established at 23. The resistances 35 and 36 serve to prevent the regulator from overadjusting which would cause hunting. Without this resistance the temperature of the milk passing through the heating chamber would tend to continue to rise or lower after proper adjustment had ceased until the milk that was at the bottom of the heating chamber reached the top.

Resistance 35 cutting back into the circuit when increasing temperature adjustment ceases, immediately reduces the voltage across the electrodes and neutralizes the tendency to further increase after adjustment stops; and resistance 36 cutting out of the circuit after decreasing temperature ceases, immediately increases the voltage across the electrodes and neutralizes the tendency to further decrease after adjustment stops. These two resistance actions thus prevent hunting.

After a brief period through the action of 23 a stabilized position will be reached by regulator 33 which will hold the temperature within very close limits of the setting at 23. 23 may now be set at any point (say between 160° and 170°) that may be desired for pasteurizing temperature. Usually 162° is chosen. Through the action of contacts 31 and 32 the temperature will quickly be stabilized at the set point.

Three-way valve 7 may now be thrown over so as to draw milk from tank 5. This will drive the saline solution ahead of it and out of the system. And as soon as flow of milk is established it will be led to the bottling machine.

During the run a variation in temperature of say one-half degree above or below the set temperature causes contact to be made at 32 or 31 which automatically causes the regulator and resistances to act and correct the same.

If for any reason the temperature drops below a predetermined limit, of say 160°, 23 contacts at 30 and circuit is established through relay 40 to auxiliary electrode 41 and from thence through the milk stream to the other side of the line (to ground). This causes relay 40 to open contacts 42 and 43. Opening 42 stops the pump motor and interrupts the flow of milk through the system. The milk then starts to flow backward into tank 5, thus returning through the electrode chamber all the milk that attempted to pass which was below 160°. The opening of contact 43 of relay 40 interrupts the circuits of the magnets of magnetic contactors 44, 45 and 46, causing them to open and throw resistances 34, 35 and 36 into circuit with current to heating chamber 12. This prevents the milk, on its backward flow, from being excessively heated. As soon as all of the cold milk which has attempted to pass above 24 has been returned to the heating chamber, the warm milk which has preceded it will contact bulb 24 and cause contact 30 to open and start the pump, and restore resistances 34, 35 and 36 to their normal circuit position.

If the milk is now above the 160° limit the pump will continue in operation. If not, it will again stop and return the milk for further heating. If, during this period, the milk above bulb 24 cools down by radiation to a point below the limit, it will all be returned through the electrode chamber and the pump will not start until its level drops below auxiliary electrode 41 which will open the magnetic circuit of relay 40 at 41, thus causing the pump to start the same as if this circuit had been opened at 39 as previously described.

This starting and stopping will continue until the temperature is above the predetermined limit, at which time the pump will resume normal operation.

If, during operation, the supply of cooling water over the electrodes is interrupted, cooling water switch 37 will open and interrupt the magnet circuit of magnetic contactor 51. This will cause its contacts 50 to open and interrupt the circuit to heating chamber 12. The temperature of the milk passing through will immediately drop below the limit and will, in the manner previously described, stop the pump and in turn stop the flow of milk. The process of starting and stopping will continue indefinitely as there is now no circuit to the heating chamber. Manual attention is now required to restore the flow of cooling water and as soon as this is done switch 37 will reestablish the magnetic circuit of contactor 51, causing its contacts to close and reestablish circuit to the heating chamber. Heat will now be applied to the milk and operation will be resumed as previously described.

In case of power failure during pasteurizing, of course the entire plant will cease operation and the milk in the system will all return by gravity to the raw milk tank. If this power failure does not extend over too long a period which would permit the spoiling of the small amount of heated milk remaining in the system, all the switches should be left in operating position and when the service is restored the pump will start and force the milk through the heating chamber until it contacts with bulb 24 and auxiliary electrode 41.

As the milk at this start will probably be below the predetermined limit, the pump will stop as previously described and the milk will be returned to the electrode chamber for further heating and a succession of starting and stopping and reheating will take place automatically until regeneration is reestablished and normal flow resumed.

When the milk in the raw milk reservoir falls below a predetermined level a circuit through the coil 39 is opened and the deenergized relay closes the alarm circuit 69 to notify the operator of the condition so that he may either renew the supply or prepare to shut down the plant.

As soon as all of the milk has been pasteurized valve 7 is thrown into position to draw the supply from the saline solution of tank 6 and this will be pumped through the system following the milk, thus driving the milk completely through ahead of it. The process of shutting down is simply by opening switch 27 which disconnects the heating circuit and controls, allowing the pump to continue to operate and pump fresh water through the system from either tank 5 or 6, thoroughly rinsing it out after which it is dismantled and thoroughly washed and sterilized in any prescribed manner.

A second less desirable method of starting the plant may be employed, as follows:

No saline solution or tank 6 need be employed. The pasteurizing temperature should be set at the desired point and not above 170°. The valve 7 is set to supply raw milk to the pump. Electrode water is of course supplied as before. Pump switch 26 and control switch 27 should be closed at the same time. This starts the pump and forces the raw milk through the regenerative coils and through heating chamber 12, but, there being no hot milk on the outside of the coils regeneration will not be established and the temperature of the milk leaving 12 will be far below the pasteurizing limit. As soon as it contacts control bulb 24 and auxiliary electrode 41, a circuit will be established through relay 40 to contact 30, which of course is also closed. This will cause the pump to stop and return what little milk left the heating chamber for reheating, whereupon a sequence of starting and stopping will take place until the milk in the heating chamber is brought up above the predetermined lower limit. As soon as this occurs this milk will be permitted to pass but as there is still no regenerated heat, the next chamber full of milk will be below the limit and the process will be repeated. In due time regeneration will be established and the controls will stabilize the plant at normal pasteurizing temperature. This is not as desirable a starting method as the one first described as an appreciable quantity of milk will be unavoidably overheated during the starting operation.

I claim:

1. In a milk pasteurizing system, a preheating heat regenerative device, a heating chamber and means for delivering the heated liquid to the preheater, a motor driven pump for forcing liquid through the preheater and the heating chamber, means for controlling the rate of flow and thermostatically controlled means for applying an alternating current to the heating chamber, said means including an induction regulator and a number of relays together with a contacting device controlling the circuits through the relays to stop the pump and decrease the voltage when the temperature of the heated liquid falls below a predetermined minimum and start the pump when the liquid in the heating chamber falls below a predetermined level and again stop the pump when the liquid in the heating chamber rises to a predetermined level and repeat such cycle until the temperature of the heated liquid reaches a predetermined value.

2. In a pasteurizing system, a preheating heat regenerative device, a heating chamber and means for delivering the heated liquid to the preheater, a motor driven pump for forcing liquid through the preheater and the heating chamber, thermostatically controlled means for applying a variable alternating current to the heating chamber, said means including an induction regulator and a number of relays together with a contacting device controlling the circuits through the relays to stop the pump and decrease the voltage when the temperature of the heated liquid falls below a predetermined minimum and start the pump when the liquid in the heating chamber falls below a predetermined level and again stop the pump when the liquid in the heating chamber rises to a predetermined level and a number of resistances and relay switches controlling the resistances for inserting additional resistance in the circuit of the output of the regulator in order to prevent hunting when the voltage is increased.

3. In a pasteurizing system, a preheating heat regenerative device, a heating chamber and means for delivering the heated liquid to the preheater, a motor driven pump for forcing liquid through the preheater and the heating chamber, means for controlling the rate of flow, thermostatically controlled means for applying an alternating current to the heating chamber, said means including an induction regulator and a number of relays together with a contacting device controlling the circuits through the relays to stop the pump and decrease the voltage when the temperature of the heated liquid falls below a predetermined minimum and start the pump when the liquid in the heating chamber falls below a predetermined level and again stop the pump when the liquid in the heating chamber rises to a predetermined level and repeat such cycle until the temperature of the heated liquid reaches a predetermined value and a number of resistances and relay switches controlling the resistances for inserting and removing additional resistance in the heating circuit to prevent hunting when the voltage is changed.

4. In a pasteurizing apparatus, the combination with an eletcric heater having a chamber for the liquid and electrodes at the sides of the chamber, of means for passing liquid through said chamber, means for applying an alternating current to said electrodes, and means for varying the voltage applied to said electrodes in response to the temperature of the liquid which has passed through the chamber, said last mentioned means including mechanism for cutting a resistance in and out of the electrode circuit to vary the voltage thereon and an inductive mechanism for simultaneously changing the voltage on the electrodes with the change due to said resistance.

5. In a pasteurizing apparatus, the combination with an electric heater having a chamber for the liquid and electrodes at the sides of the chamber, of means for passing liquid through said chamber, means for applying an alternating current to said electrodes, and means for varying the voltage applied to said electrodes in response to the temperature of the liquid which has passed through the chamber, said last mentioned means including mechanism for cutting a resistance in and out of the electrode circuit to vary the voltage thereon and an inductive mechanism for simultaneously changing the voltage on the electrodes with the change due to said resistance, said mechanism for cutting in or out a resistance and said inductive mechanism being additive in effect.

6. In a pasteurizing apparatus, the combination with an electric heater having a chamber for the liquid and electrodes at the sides of the chamber, of means for passing liquid through said chamber, means for applying an alternating current to said electrodes, and means for varying the voltage applied to said electrodes in response to the temperature of the liquid which has passed through the chamber, said last mentioned means including mechanism for cutting a resistance in and out of the electrode circuit to vary the voltage thereon and an inductive mechanism for simultaneously changing the voltage on the electrodes with the change due to said resistance, said mechanism for cutting in or out a resistance and said inductive mechanism being additive and adapted to have one of said mechanisms eliminated.

7. In a pasteurizing apparatus, the combination with an electric heater having a chamber for the liquid and electrodes at the sides of the chamber, of means for passing liquid through said chamber, means for applying an alternating current to said electrodes, and means for varying the voltage applied to said electrodes in response to the temperature of the liquid which has passed through the chamber, said last mentioned means including mechanism for cutting a resistance in and out of the electrode circuit to vary the voltage thereon and an inductive mechanism for simultaneously changing the voltage on the electrodes with the change due to said resistance, said mechanism for cutting in or out a resistance and said inductive mechanism being additive and then opposed in effect to reduce the tendency to hunt.

8. In a pasteurizing apparatus, the combination with an electric heater having a chamber for the liquid and electrodes at the sides of the chamber, of means for passing liquid through said chamber, means for applying an alternating current to said electrodes, means for varying the voltage applied to said electrodes in response to the temperature of the liquid which has passed through the chamber, said last mentioned means including mechanism for cutting a resistance in and out of the electrode circuit to vary the voltage thereon and an inductive mechanism for simultaneously changing the voltage on the electrodes with the change due to said resistance, and a relay for simultaneously moving both the inductive and resistance mechanisms to increase the voltage on the electrodes until the temperature of the liquid has reached a predetermined value when at least one of said mechanisms is changed.

9. In a pasteurizing apparatus, the combination with an electric heater having a chamber for the liquid and electrodes at the sides of the chamber, of means for passing liquid through said chamber, means for applying an alternating current to said electrodes, means for varying the voltage applied to said electrodes in response to the temperature of the liquid which has passed through the chamber, said last mentioned means including mechanism for cutting a resistance in and out of the electrode circuit to vary the voltage thereon and an inductive mechanism for simultaneously changing the voltage on the electrodes with the change due to said resistance, a relay for simultaneously moving both the inductive and resistance mechanisms to increase the voltage on the electrodes until the temperature of the liquid has reached a predetermined value when at least one of said mechanisms is changed, and another relay responsive to a further predetermined increase in temperature of said liquid for reversing the action of said inductive mechanism to lower the voltage on said electrodes and simultaneously cut a resistance into the electrode circuit.

10. In a pasteurizing apparatus, the combination with an electric heater having a chamber for the liquid and electrodes at the sides of the chamber, of resistance elements adapted to be selectively cut in and out of the electrode circuit, an inductive device adapted to raise or lower the voltage on the electrodes in addition to the effect of said resistance element, and relays one of which is responsive to the temperature of the liquid which has passed through said chamber for changing the voltage on the electrodes by the simultaneous additive effect of a resistance element and said inductive device, said relay being adapted on attainment of a predetermined liquid temperature to change the effect of a resistance element to oppose the effect of the inductive device.

11. In a pasteurizing apparatus, the combination with an electric heater having a chamber for the liquid and electrodes at the sides of the chambers, of resistance elements adapted to be selectively cut in and out of the electrode circuit, an inductive device adapted to raise or lower the voltage on the electrodes in addition to the effect of said resistance elements, and relays one of which is responsive to the temperature of the liquid which has passed through said chamber for changing the voltage on the electrodes by the simultaneous additive effect of a resistance element and said inductive device, said relay being adapted on attainment of a predetermined liquid temperature to change the effect of a resistance element to oppose the effect of the inductive device, another of said relays being adapted on attainment of another predetermined temperature to reverse the movement of said inductive device and control another resistance with respect to the electrode circuit.

12. In a pasteurizing apparatus, the combination with an electric heater having a chamber for the liquid and electrodes at the sides of the chamber, of resistance elements adapted to be selectively cut in and out of the electrode circuit, an inductive device adapted to raise or lower the voltage on the electrodes in addition to the effect of said resistance elements, and relays one of which is responsive to the temperature of the liquid which has passed through said chamber for changing the voltage on the electrodes by the simultaneous additive effect of a resistance element and said inductive device, said relay being adapted on attainment of a predetermined liquid temperature to change the effect of a resistance element to oppose the effect of the inductive device, another of said relays being adapted on attainment of another predetermined temperature to reverse the movement of said inductive device and control another resistance with respect to the electrode circuit, said inductive device including an inductor regulator and a motor for driving the same in one direction in response to one relay and for driving the same in the opposite direction in response to another relay.

BENJAMIN E. GETCHELL.